United States Patent [19]
Moore

[11] 3,979,660
[45] Sept. 7, 1976

[54] START-UP CIRCUIT FOR STATIC INVERTER

[75] Inventor: Thomas W. Moore, Dayton, Ohio

[73] Assignee: AMF Incorporated, White Plains, N.Y.

[22] Filed: July 25, 1975

[21] Appl. No.: 599,148

[52] U.S. Cl. .................................... 321/11; 321/19; 321/45 S
[51] Int. Cl.² ........................................ H02M 1/18
[58] Field of Search .................. 321/11, 14, 18, 19, 321/45 S

[56] References Cited
UNITED STATES PATENTS

| | | |
|---|---|---|
| 3,027,508 | 3/1962 | Johnson ................................ 321/19 |
| 3,355,653 | 11/1967 | Paradissis ........................... 321/45 S |
| 3,391,325 | 7/1968 | Giannamore ......................... 321/11 |
| 3,579,077 | 5/1971 | Cameron ............................. 321/18 |
| 3,601,680 | 8/1971 | Beckwith ............................. 321/18 |
| 3,769,568 | 10/1973 | Hamilton et al. ..................... 321/19 |
| 3,879,647 | 4/1975 | Hamilton et al. .................. 321/45 S |

Primary Examiner—William H. Beha, Jr.
Attorney, Agent, or Firm—George W. Price; John H. Gallagher

[57] ABSTRACT

Protection circuit for preventing high surge current on start up of static inverter.

12 Claims, 3 Drawing Figures

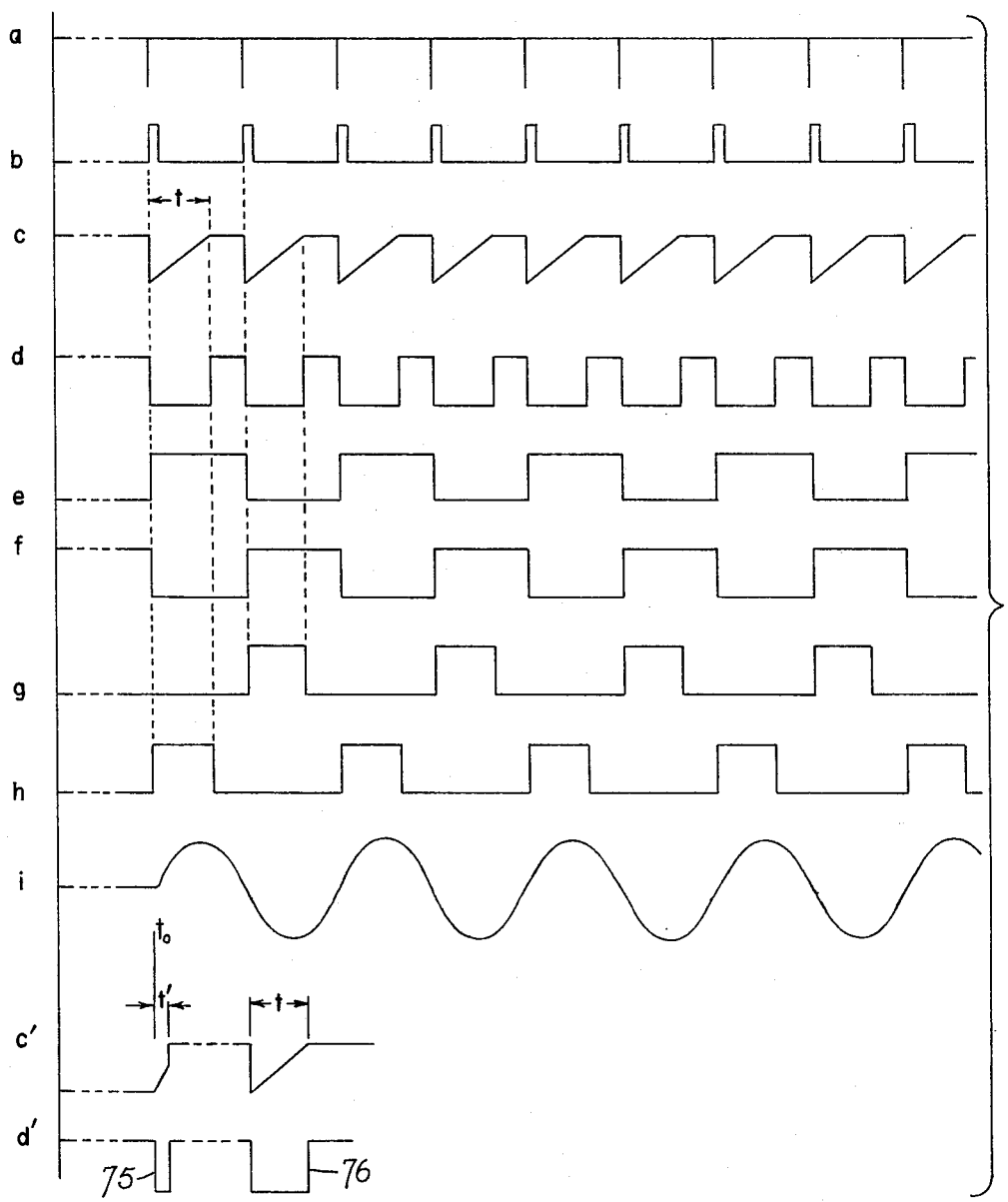
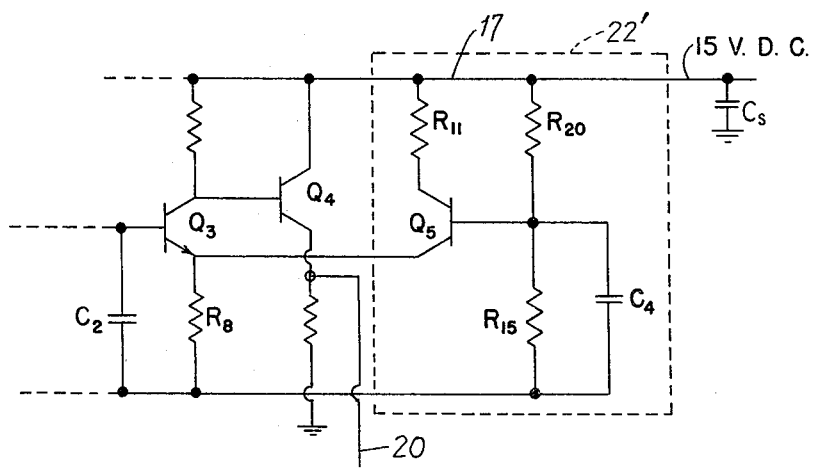
FIG. 2
FIG. 3

START-UP CIRCUIT FOR STATIC INVERTER

This invention relates to a protective circuit for a static inverter to limit the current on start up of the inverter. The protective circuit eliminates the possibility of damage to semiconductor circuit components due to high surge currents that might occur at start up if a protective circuit were not used.

The circuit of this invention will be described by referring to the accompanying drawings wherein:

FIG. 2 is a series of simplified waveforms used in explaining the operation of the circuit of FIG. 1; and FIG. 3 is a schematic illustration of an alternative embodiment of a protection circuit constructed in accordance with this invention.

Figure 1:
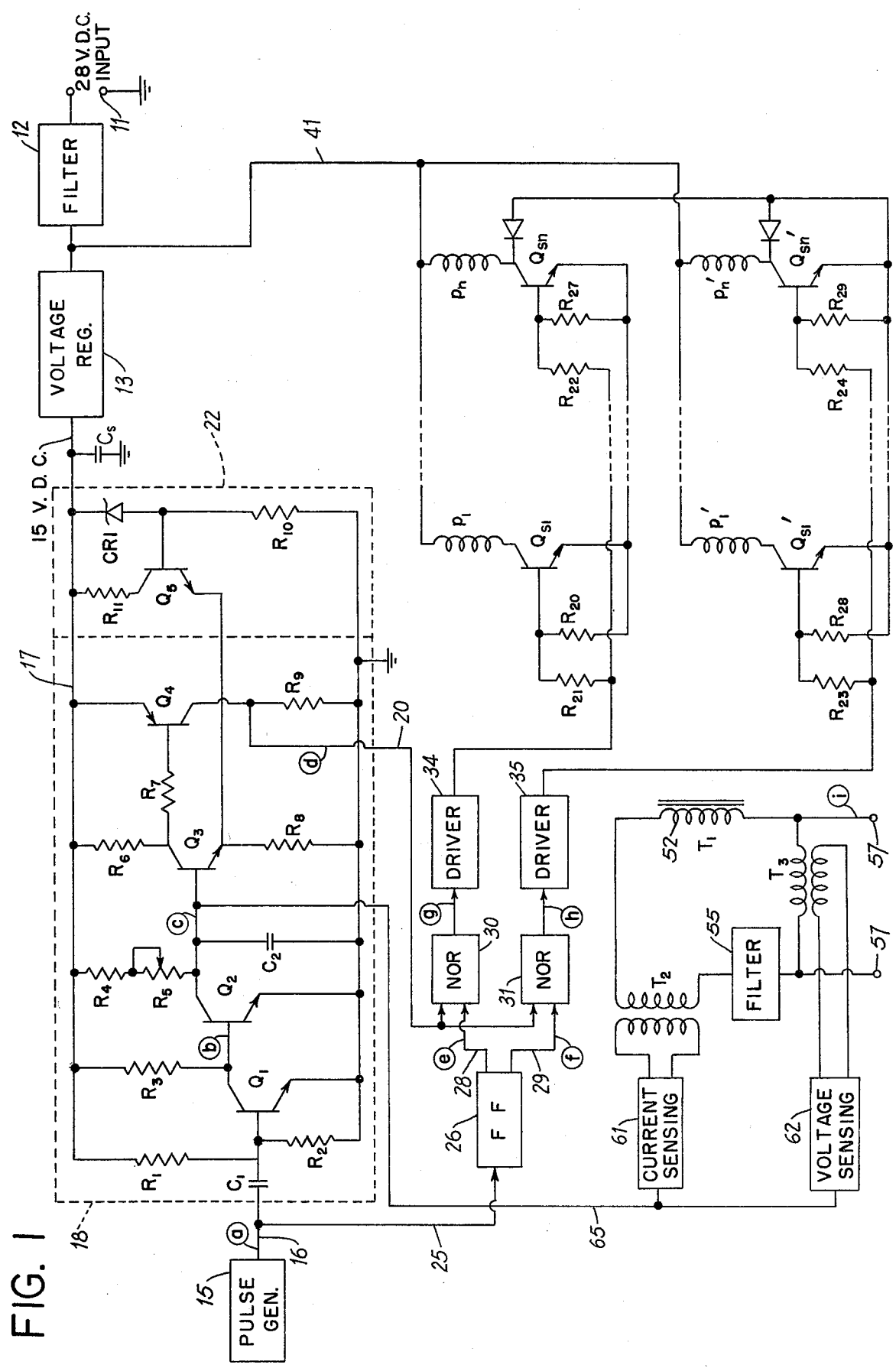
FIG. 1 is a circuit diagram partially in schematic form and partially in block form illustrating the protective circuit of this invention used in a solid state static inverter.

Referring to FIG. 1, power to the inverter circuit is applied at input terminals 11. Input voltage is filtered in filter 12 and regulated to a 15 volt level by voltage regulator 13. Capacitor Cs is a relatively large storage capacitor coupled to the output of voltage regulator 13. A storage capacitor of this type commonly is provided as an aid to minimize a drop in line voltage in the presence of a sudden demand. As will be discussed below, a short time is required after initial energization of the system for the voltage across capacitor Cs to build up to full line voltage. It is to be understood that only the portion of the circuitry illustrated in schematic form is shown connected to the power source. The portion of the circuitry illustrated in block form may be well known circuitry, and for simplicity of illustration the connections to the source of power, where applicable, have been omitted.

Pulse generator 15, a relaxation oscillator for example, produces the output pulses of FIG. 2a at a rate twice the frequency of the desired output frequency from the inverter circuit. For purpose of discussion it will be assumed that the pulse repetition frequency of pulse generator 15 is 800 pulses per second.

The output of pulse generator 15 is coupled over lead 16 to the input of a monostable circuit 18. Monostable circuit 18 includes resistors $R_1$ through $R_9$, capacitors $C_1$ and $C_2$, npn transistors $Q_1$–$Q_3$ and pnp transistor $Q_4$. The output of monostable circuit 18 is taken on lead 20 which is connected at the junction between resistor $R_9$ and the collector electrode of pnp transistor $Q_4$. This output is illustrated in FIG. 2d and is a series of negative control pulses occurring at a rate of 800 pulses per second. The operation of the monostable circuit will be explained in detail below.

The protective feature of the present invention is provided by the circuit elements shown in block 22 and includes Zener diode $CR_1$ and resistor $R_{10}$ connected between the 15 volt input supply line 17 and ground. The base electrode of npn transistor $Q_5$ is coupled to a junction between Zener diode $CR_1$ and resistor $R_{10}$. The collector electrode of $Q_5$ is coupled through resistor $R_{11}$ to supply line 17. The emitter electrode of transistor $Q_5$ is coupled to resistor $R_8$ which is common to the emitter of transistor $Q_3$.

Although the specific features of the remaining portions of the inverter circuit are not the subject of the present invention they will be explained briefly in order to provide background for the detailed description of the operation of the protective circuit of this invention.

The output of pulse generator 15, FIG. 2a, is coupled over leads 16 and 25 to the input of flip flop circuit 26. The two output signals of flip flop 26 are 400 Hz. square waves which are 180° out of phase, FIGS. 2e and 2f. Each output lead 28 and 29 of flip flop 26 is coupled as one input to a respective NOR gate 30, 31. The other input signal to each NOR gate is the 800 pulses per second output on lead 20 from monostable circuit 18. Because the two 400 Hz. output signals from flip flop 26 are out of phase, FIGS. 2e and 2f, and because the negative pulses from monostable circuit 18 are at a rate of 800 pps., FIG. 2d, NOR gates 30 and 31 will conduct alternately on successive control pulses from the monostable circuit. Therefore, the output of each NOR gate, FIGS. 2g and 2h, is a series of positive pulses having a repetition frequency of 400 pulses per second and the two series are 180° out of phase with each other. The durations, or duty cycles, of the output pulses of NOR gates 30 and 31, FIGS. 2g and 2h, are established by the durations, or duty cycles, of the negative going control pulses on lead 20 from monostable circuit 18, FIG. 2d.

The outputs of NOR gates 30 and 31, which are alternately occurring series of positive pulses each at a frequency of 400 pulses per second, are amplified in respective driver circuits 34 and 35, and the two series of amplified pulses are coupled to the base electrodes of respective groups of parallel connected switching transistors $Qs_1 \ldots Qsn$ and $Qs_1' \ldots Qsn'$. In practice, as many as 10 switching transistors might be parallel connected in each one of the groups.

Each switching transistor has a primary winding $p$ of an output transformer $T_1$ connected between its collector electrode and lead 41 which is connected to the d.c. power source. The two groups of primary windings $p_1 \ldots pn$ and $p_1' \ldots pn'$ are wound push pull on the transformer $T_1$. Because the two groups of switching transistors $Qs_1 \ldots Qsn$ and $Qs_1' \ldots Qsn'$ conduct alternately in response to the alternately occurring series of pulses of FIGS. 2g and 2h, the two groups of primary windings are alternately excited to produce in the secondary winding 52 of trnsformer $T_1$ an a.c. output signal of generally rectangular waveform.

The output of transformer $T_1$ is passed through filter circuit 55 to improve its waveform and is coupled to output terminals 57, see FIG. 2i.

To provide regulation of the output voltage as a function of changes in the load coupled to output terminals 57, transformers $T_2$ and $T_3$ and respective current sensing circuit 61 and voltage sensing circuit 62 are coupled between transformer $T_1$ and the output terminals 57. Sensing circuits 61 and 62 produce d.c. output signals which are functions of the inverter output current and voltage. These outputs are coupled by lead 65 back to monostable circuit 18 to change the charging time of capacitor $C_2$ and thus the duration or duty cycle of the negative pulses of the waveform FIG. 2d in such a manner as to maintain the inverter output at terminals 57 substantially constant.

The detailed operation of monostable circuit 18 and protective circuit 22 now will be described to explain how the protective circuit 22 functions to limit the output current of the inverter on start up.

The functioning of monostable circuit 18 during its stable condition is as follows. In the absence of a pulse from pulse generator 15, capacitor $C_1$ is fully charged through resistor $R_1$. Base drive therefore is provided to transistor $Q_1$ and it conducts through resistor $R_3$ to ground. The conduction of transistor $Q_1$ deprives transistor $Q_2$ of base drive and it is in a nonconducting state. Capacitor $C_2$ therefore charges through resistors $R_4$ and $R_5$ in the collector circuit of transistor $Q_2$. Capacitor $C_2$ charges approximately linearly with time until the voltage exceeds by one diode potential (around 0.7 volts) the base emitter potential of transistor $Q_3$. At this level the current through resistors $R_4$ and $R_5$ is used to provide base drive to transistor $Q_3$ rather than further increase the voltage across capacitor $C_2$, see FIG. 2c. Transistor $Q_3$ therefore conducts. the conduction of transistor $Q_3$ causes base current to flow in pnp transistor $Q_4$ and a positive voltage is developed across output resistor $R_9$, see FIG. 2d.

Upon occurrence of a negative going pulse from pulse generator 15, FIG. 2a, transistor $Q_1$ turns off, FIG. 2b, and base drive current is provided to turn on transistor $Q_2$. Capacitor $C_2$ immediately discharges through conducting transistor $Q_2$, see FIG. 2c. The low voltage on discharged capacitor $C_2$ is coupled to the base of transistor $Q_3$ and causes the opposite conductivity type transistors $Q_3$ and $Q_4$ both to turn off. Current ceases to flow through resistor $R_9$ and the output signal on lead 20 goes low, FIG. 2d.

Upon termination of the input pulse from pulse generator 15, capacitor $C_1$ charges and transistor $Q_1$ will turn on. Transistor $Q_2$ turns off and capacitor $C_2$ begins to charge at a rate determined by the time constant $R_4R_5C_2$. In FIG. 2c, the sloping portion of the waveform represents the charge accumulating on capacitor $C_2$. When the charge on capacitor $C_2$ reaches a predetermined level indicated at 72 in FIG. 2c, transistors $Q_3$ and $Q_4$ will conduct and the output voltage on lead 20, FIG. 2d, will go high.

In normal sustained operation, the circuit continues to operate as described above to produce a series of regularly occurring negative going control pulses of FIG. 2d.

Upon initial start up of the inverter circuit one or both groups of switching transistors $Qs_1 \ldots Qsn, Qs_1' \ldots Qsn'$ might be rendered conductive and a large and destructive surge of current might flow through the switching transistors. Protective circuit 22 limits the initial surge of current in the following manner. As power is first applied to the circuit, at time $t_o$, storage capacitor $Cs$ begins to charge up to line voltage at a relatively slow rate. Capacitor $C_2$ also begins to charge up, FIG. 2c'. In protective circuit 22, Zener diode $CR_1$ has approximately a 6.2 volt breakdown, so until the voltage on slowly charging storage capacitor $Cs$ reaches that potential, Zener diode $CR_1$ is nonconductive and transistor $Q_5$ also is nonconductive. Because transistors $Q_3$ and $Q_5$ both are off, substantially no current flows through resistor $R_8$ and the potential on the emitter of transistor $Q_3$ is substantially ground potential. Therefore, transistor $Q_3$ will be rendered conductive as soon as the potential on capacitor $C_2$ rises above the base-emitter drop of transistor $Q_3$. In the example assumed here, this will be of the order of 0.8 volts. Transistor $Q_3$ therefore conducts almost immediately, see FIG. 2c', and the output on line 20, FIG. 2d', is a very narrow pulse 75 which is much narrower than a normal output pulse 76, FIG. 2d. Because the negative going control pulse 75 of FIG. 2c' is coupled to both NOR gates 30 and 31, the signal coupled through one of the drivers 34 or 35 to the base electrodes of a grouup of switching transistors $Qs_1 \ldots Qsn$ or $Qs_1' \ldots Qsn'$ is only a very narrow pulse corresponding to the width of pulse 75 of FIG. 2d'. Consequently, any conducting switching transistors will be turned off at the conclusion of narrow control pulse. Therefore, no large surges of current can flow through the switching transistors upon start up.

After the occurrence of the first few output pulses from pulse generator 15, which may be chosen to be five or six pulses for example, and the resultant operation of protective circuit 22 as just described, the protective circuit operates as follows to permit normal operation of the monostable circuit 18. After the voltage on storage capacitor $Cs$ has built up to a value in excess of the breakdown voltage of Zener diode $CR_1$, the Zener diode will break down and apply a sufficient voltage to the base of transistor $Q_5$ to cause $Q_5$ to conduct through resistors $R_{11}$ and $R_8$. Current flow through resistor $R_8$ raises the potential on the emitter of transistor $Q_3$ considerably above ground potential, to approximately 8.2V., and will require the potential on the base of transistor $Q_3$ (charge on capacitor $C_2$) to rise to a potential slightly higher than 8.2 volts for transistor $Q_3$ to conduct. Consequently, the charging of capacitor $C_2$ to its normal predetermined potential requires the full time period $t$, FIG. 2c rather than the much shorter time $t'$, FIG. 2c', that occurred on initial start up.

In the example discussed here, Zener diode $CR_1$ was selected to have a breakdown voltage of approximately 6.2 volts. The breakdown level of the Zener diode, or an equivalent breakdown device, is not critical. As examples only, the breakdown voltage may range from approximately one-third to one-half of the full voltage on line 17 of the supply source.

During normal operation, the continuous conduction of transistor $Q_5$ through resistor $R_8$ to ground serves to stabilize the operation of transistor $Q_3$. This results from the fact that the stable voltage across resistor $R_{10}$ supplies a steady base electrode bias to transistor $Q_5$ and from the fact that the emitter follower configuration of transistor $Q_5$ and resistor $R_8$ couples the stable reference potential to the emitter of transistor $Q_3$. This serves to hold the emitter of transistor $Q_3$ at a steady potential and $Q_3$ will conduct at substantially the same base potential each time capacitor $C_2$ charges up. Because the charging time of capacitor $C_2$ ultimately determines the on time or duty cycle of the switching transistors $Qs_1 \ldots Qsn$ and $Qs_1' \ldots Qsn'$, (compare the waveforms of FIGS. 2c, 2g and 2h), the inclusion of the protective circuit 22 also adds stability to the operation of the inverter circuit. A protective circuit operating in accordance with the teachings of this invention may take the form of the alternative embodiment illustrated by the circuit 22' in FIG. 3. In this circuit the Zener diode has been replaced by a large resistor $R_{20}$, and a relatively large capacitor $C_4$ is connected in shunt with resistor $R_{15}$. Upon initial energization of the circuit, the gradual build up of charge on the large capacitor $C_4$ will cause a delay in the initial turn on of transistor $Q_5$, much the same as the delay produced by the Zener diode $CR_1$ in the protective circuit of FIG. 1. The circuit operation otherwise is the same as the circuit of FIG. 1 since after capacitor $C_4$ charges to a predetermined level, transistor $Q_5$ will conduct.

Representative values and type designations of illustrated circuit components employed in the embodiments of FIGS. 1 and 2 are as follows.

R1, R2 — 10 k ohm

R3, R4, R6, R8, R9, R11 — 1 k ohm
R5 — 47 k ohm
R10 — 4.7 k ohm
R15 — 10 k ohm
R20 — 6.8 k ohm
R21-R24 — .15 ohm
R26-R29 — 51 ohm
$C_s$ — 15 µf
C1 — .01 µf
C2 — .1 µf
C4 — 100 µf
Q1, Q2, Q3, Q5 — 2N5449
Q4 — 2N5447
$Q_{s1} \ldots Q_{sn}, Q_{s1}' \ldots Q_{sn}'$ — 2N6328
CR1 — 6.2v. Zener Although specific types of semiconductor transistors and Zener diode are given it is to be understood that any suitable types of three electrode controllable conduction devices and voltage breakdown devices may be employed in the practice of this invention.

In its broader aspects, this invention is not limited to the specific embodiment illustrated and described. Various changes and modifications may be made without departing from the inventive principles herein disclosed.

What is claimed is:

1. In a static inverter of the type employing a monostable circuit which produces a series of pulses whose widths control, at least in part, the power output of the inverter, and wherein said monostable circuit includes pulse width determining means comprised of a three electrode controllable conduction device having a control electrode and second and third electrodes and whose on and off conduction states are a function of the difference between the potentials on the control and second electrodes, said monostable circuit further including a resistance-capacitance charging circuit coupled to the control electrode of the controllable conduction device, the inverter further including means for discharging the capacitor of the charging circuit at a predetermined repetition rate, the improvement of means for limiting the period of a given conduction state of the controllable conduction device upon start up of the inverter, comprising resistance means connected between said second electrode of the controllable conduction device and a reference potential, means for passing a pedetermined magnitude of current through said resistance means to establish a predetermined potential at said second electrode, said predetermined potential being of a value to require said charging circuit normally to charge in a given time to the potential required to change the conduction state of the controllable conduction device from said given state, means responsive to the operation of said controllable conduction device for producing output pulses having durations corresponding to the periods that said controllable conduction device is in said given conduction state, and means for delaying the application of said predetermined magnitude of current to said resistance means upon initial application of power to said inverter circuit, whereby the time for said charging circuit to charge to a potential sufficient to change the conduction state of the controllable conduction device from said given state is decreased upon initial application of power to the inverter circuit.

2. The combination claimed in claim 1 wherein said means for delaying the application of said predetermined magnitude of current to said resistance means comprises a second three terminal controllable conduction device having a control electrode and second and third electrodes, the two controllable conduction devices having their second electrodes parallel connected to said resistance means and their third electrodes coupled to a voltage supply source, means for producing a gradual build up to full voltage of said supply source, a series arrangement of a voltage breakdown device and a second resistance means successively coupled between said supply source and a reference potential, the control electrode of the second controllable conduction device being connected to a junction between said breakdown device and second resistance means, said breakdown device breaking down to conduct current at a voltage level thereacross less than the full voltage of said supply source, the value of said second resistance means being so proportioned with respect to the characteristics of the second controllable conduction device to establish said predetermined potential at the second electrode of the first controllable conduction device when the breakdown device and second controllable conduction device are conducting current.

3. The combination claimed in claim 1 where said means for producing output pulses is comprised of a third controllable conduction device having conduction characteristics the inverse of those of the first controllable conduction device.

4. In a static inverter that includes pulse generating means that produces pulses at a rate twice the desired output frequency of the inverter, and further includes a monostable circuit operating in response to said pulses to produce a series of control pulses whose durations control, at least in part, the conduction of switching devices that are operated to produce an output a.c. voltage at said desired frequency, the improvement of a protection circuit operable with said monostable circuit to limit the duration of the first pulse of said series of control pulses thereby to prevent damaging surge current from flowing through said switching devices upon initial application of power to said inverter, said improvement comprising a resistance-capacitance charging circuit connected across a voltage source, means operable in response to pulses from said pulse generating means for discharging said charging circuit at said rate twice the desired output frequency, said charging circuit normally building up a charge to at least a given charge in the periods between discharges, means operable in response to said charging circuit for producing output control pulses having durations substantially corresponding to the periods required for said charging circuit to build up to said given charge, said last named means including a controllable conduction device having second and third electrodes coupled across said source and having a control electrode coupled to said charging circuit, the conduction states of the controllable conduction device being a function of the potential difference between its control and second electrodes, said protection circuit comprising a second controllable conduction device having a control electrode and second and third electrodes, the third electrode of the second conduction device being coupled to said source, resistance means coupled between the second electrodes of the two conduction devices and the reference potential conductor of said source, the second controllable conduction device, when conducting, providing a predetermined current flow through said resistance means, whereby said first conduction device normally becomes conductive only when said charging circuit builds up a charge to said given charge, means including means coupled to the control electrode of the second controllable conduction device for maintaining said second conduction device nonconductive until after occurrence of the first several pulses from said pulse generating means and then conductive thereafter, whereby upon initial application of power to said inverter circuit said second conduction device initially is nonconductive and no current flows therethrough to said resistance means, thereby permitting the first conduction device to conduct when the charge on said charging circuit is a second charge less than said given charge.

5. The combination claimed in claim 4 wherein said means coupled to the control electrode of the second controllable conduction device comprises, first and second impedance means coupled across said voltage source, the control electrode of the second conduction device being coupled to a junction between said impedance means, at least one of said impedance means having a voltage characteristic that changes as a function of time after initial energization of said voltage source.

6. The combination claimed in claim 5 wherein the means for maintaining said second conduction device nonconductive includes means for delaying for a finite time the build up to full voltage of said supply source.

7. The combination claimed in claim 5 wherein said one impedance means is a parallel resistance-capacitance circuit connected between the control electrode of the second conduction device and the reference potential conductor of the voltage source.

8. The combination claimed in claim 6 where said one impedance means is a voltage breakdown device connected between the control electrode of the second conduction device and the conductor of the voltage source which will bias the second conduction device into conduction, said breakdown device becoming conductive at a potential thereacross which is less than the full potential of said voltage source.

9. In a static inverter having switching devices which are selectively operable in response to control pulses to produce an a.c. output, improved means for limiting the duration of said control pulses on initial application of a source of supply to the inverter, comprising pulse generating for generating pulses at a predetermined rate, monostable circuit means responsive to said pulses for producing output control pulses at said predetermined rate, said monostable circuit including a charging circuit, means coupling said charging circuit to said pulse generating means for discharging said charging circuit upon occurrence of each pulse, said charging circuit charging up to at least a given potential in the periods between discharges, a controllable conduction semiconductor device having a control electrode and second and third electrodes, said control electrode being coupled to said charging circuit, a second controllable conduction semiconductor device connected in emitter follower circuit configuration between the conductors of said supply source, the second electrodes of the two devices being connected in parallel and the third electrodes of said devices being coupled to the supply source, means including means coupled to the control electrode of the second device for maintaining the second device nonconductive until a predetermined time after the first pulse output of said pulse generating means, said last named means providing subsequently to the predetermined time after said first pulse output a bias for producing current flow in the emitter follower conduction device that biases the second electrode of the first conduction device to cause conduction of the second device only when the charging circuit is charged to at least said given potential.

10. The combination claimed in claim 9 wherein said last named means includes means for producing a gradual build up to full voltage of said supply source.

11. The combination claimed in claim 9 wherein the means coupled to the control electrode of the second device includes, a voltage breakdown device coupled between the control electrode of the second device and said supply source, said breakdown device breaking down into conduction at a voltage thereacross less than the full voltage of the supply source.

12. The combination claimed in claim 11 wherein said breakdown device is a Zener diode.

* * * * *